United States Patent
Dani et al.

(10) Patent No.: US 7,426,561 B2
(45) Date of Patent: Sep. 16, 2008

(54) CONFIGURABLE ASSIGNMENT OF WEIGHTS FOR EFFICIENT NETWORK ROUTING

(75) Inventors: Amod Dani, Santa Clara, CA (US); Asang Dani, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1387 days.

(21) Appl. No.: 10/259,336

(22) Filed: Sep. 27, 2002

(65) Prior Publication Data

US 2004/0064583 A1    Apr. 1, 2004

(51) Int. Cl.
 *G06F 15/173* (2006.01)
 *G06F 9/46* (2006.01)
(52) U.S. Cl. .................. 709/226; 709/223; 709/238; 709/241; 718/105
(58) Field of Classification Search .............. 709/223, 709/226, 238, 241; 718/105
See application file for complete search history.

(56) References Cited

U.S. PATENT DOCUMENTS 5,872,930 A * 2/1999 Masters et al. .............. 709/223

OTHER PUBLICATIONS

Burton, Robert C., "*Fibre Channel*", pp. 1-11, [online] ftp://ftp.netlab.ohio-state.edu/pub/jain/courses/cis788-95/fiber_channel/index.html.

* cited by examiner

*Primary Examiner*—William C. Vaughn, Jr.
*Assistant Examiner*—Peling A Shaw
(74) *Attorney, Agent, or Firm*—Conley Rose, P.C.

(57) ABSTRACT

A load balancing technique for use in a switch fabric balances network traffic from a plurality of end node devices based on the volume of traffic on the peripheral links, not simply the rated bandwidth of the peripheral links. In one embodiment, weight values, based on the volume of peripheral link traffic, are used to modify default cost values associated with the peripheral links. The modified default cost values are then used in the load balancing process. In another embodiment, the costs of the peripheral links are adjusted commensurate with the volume of peripheral link traffic.

23 Claims, 4 Drawing Sheets

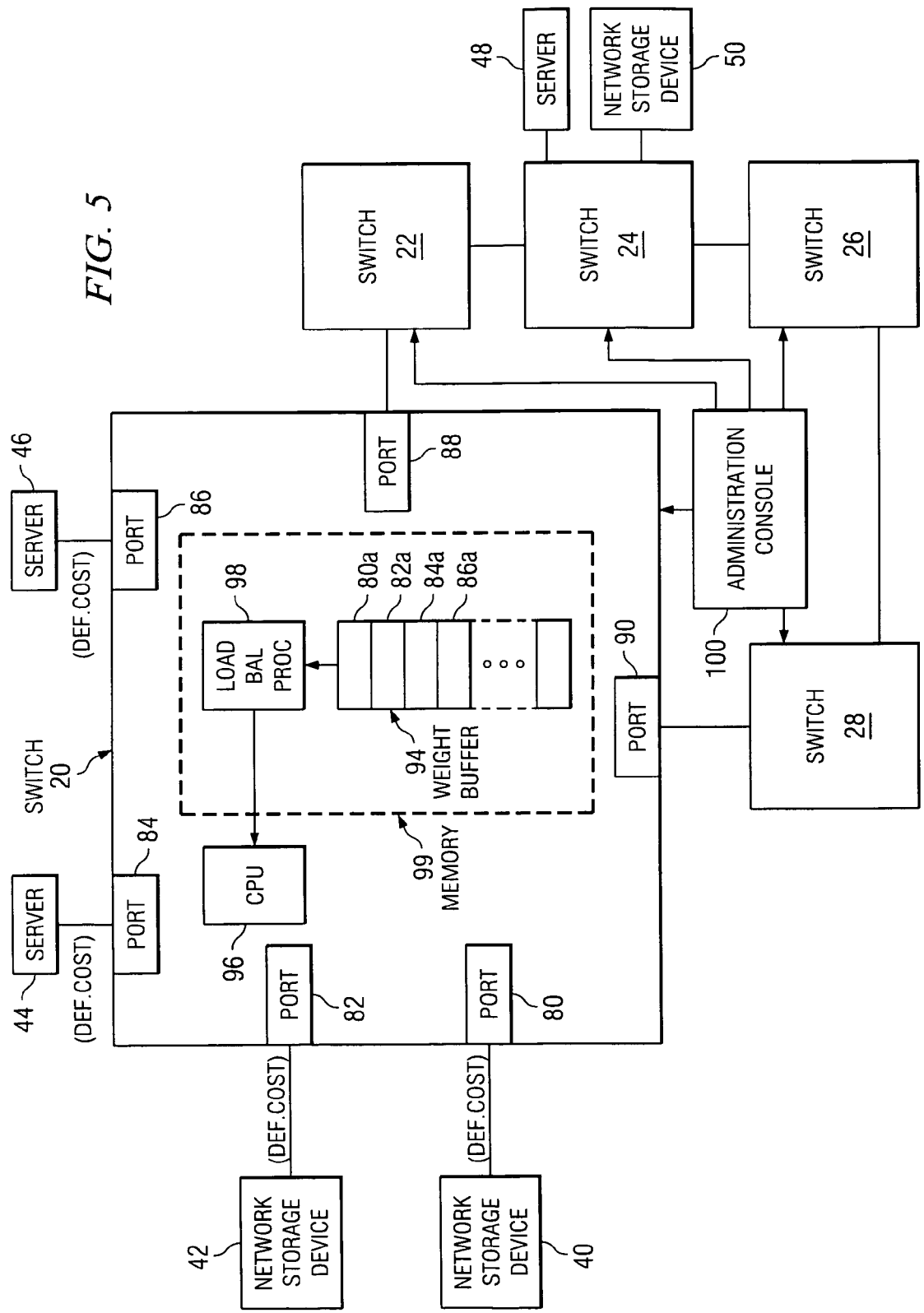

CONFIGURABLE ASSIGNMENT OF WEIGHTS FOR EFFICIENT NETWORK ROUTING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to computer networks. More particularly, the invention relates to electronic switches through which communications pass from one point in a network to another. Still more particularly, the invention relates to load balancing in a switch-based fabric.

2. Background Information

Initially, computers were most typically used in a standalone manner. It is now commonplace for computers and other types of computer-related and electronic devices to communicate with each other over a network. The ability for computers to communicate with one another has lead to the creation of networks ranging from small networks comprising two or three computers to vast networks comprising hundreds or even thousands of computers. Networks can be set up to provide a wide assortment of capabilities. For example, networks of computers may permit each computer to share a centralized mass storage device or printer. Further, networks enable electronic mail and numerous other types of services. Generally, a network's infrastructure comprises switches, routers, hubs and the like to coordinate the effective and efficient transfer of data and commands from one point on the network to another.

Networks often comprise a "fabric" of interconnected switches which are devices that route data packets from a source port to a destination port. FIG. 1 exemplifies a switch fabric having five switches 20, 22, 24, 26, and 28. The switches 20-28 are interconnected by links 30-38, as shown. One or more end node devices can be connected to one or more of the switches. In FIG. 1, four end node devices 40, 42, 44 and 46 are connected to switch 20 and two end node devices 48 and 50 connect to switch 24. The devices 40-50 may be of any desirable type of device. For example, devices 40, 42 and 50 comprise network storage devices and devices 44, 46 and 48 comprise servers.

An end node device 40-46 connected to switch 20 may need to send a data packet to an end node device 48, 50 connected to switch 24. The packet can be routed from switch 20 to switch 24 via one of two paths in the exemplary architecture of FIG. 1. One path comprises switches 20-22-24 and the other path comprises switches 20-28-26-24. In many networks, the path that will be used between pairs of switches is determined a priori during system initialization or when the fabric configuration changes such as the addition or removal of a switch. Various path selection algorithms have been suggested and used. One such conventional path selection algorithm is often referred to as the "shortest path" algorithm. According to this algorithm, the shortest path is selected to be the path for routing packets between switches. The shortest path takes into account the bandwidth of the various links interconnecting the switches.

Referring still to FIG. 1, a "cost" value is assigned to each link. The numbers shown in parentheses adjacent each link represents the cost of each link. The cost values are generally arbitrary in magnitude, but typically correlate with the inverse of the bandwidth of the links. That is, higher bandwidth links have lower costs and lower bandwidth links have higher costs. For example, links 30 and 32 may have the same bandwidth of 1 gigabits per second ("gbps") and, as such, may be assigned a cost value of 1000. Links 34, 36, and 38 may have twice the bandwidth of links 30 and 32 (2 gbps) and accordingly may be assigned cost values of 500 (one-half of the cost of links 30 and 32). The shortest path between switches 20 and 24 represents the path with the lowest total cost. The total cost of a path is the sum of the costs associated with the links comprising the path. In the example of FIG. 1, the path comprising switches 20-22-24 has a total cost of 2000, while the total cost of the 20-28-26-24 path is 1500. As the lowest cost path, the 20-28-26-24 path will be selected to be the path used for routing data packets between end node devices 40-46 and 48-50.

When computing the lowest cost path between a pair of switches (e.g., switches 20 and 24), it may be that two or more paths have the lowest, yet equal, cost. In this situation, a load balancing technique is employed to determine how to balance the traffic loads between the various lowest cost paths. For example, in FIG. 2 three paths exist between switches 60 and 70. Path A includes switches 60-62-68-70, while paths B and C include switches 60-66-74-76-70 and 60-66-64-72-74-76-70, respectively. The cost of paths A and B is 3000 while the cost of path C is 5500. Thus, paths A and B are selected as the lowest cost paths and the network traffic from switch 60 destined for switch 70 is balanced between those two paths.

One load balancing technique that has been used is to distribute end node devices among the various lowest cost paths based on the rated bandwidths of the links connecting the end nodes to their associated switches. Such links are referred to as "peripheral links" for purposes of this disclosure and are identified in FIG. 2 with the reference numeral 43. For example, peripheral links 43 in FIG. 2 may all be 2 gbps links and thus the four end node devices 40-46 will be distributed evenly between the two lowest cost paths A and B with two of the end node devices connected to switch 60 assigned to path A and the other two end node devices assigned to path B.

Although current load balancing schemes, such as that described above, generally work well, there is always room for improvement to make a network operate more efficiently. Accordingly, any improvement in load balancing schemes is highly desirable.

BRIEF SUMMARY OF THE PREFERRED EMBODIMENTS OF THE INVENTION

The preferred embodiments of the present invention solve the problems noted above by providing a load balancing technique which balances network traffic from a plurality of end node devices based on the volume of traffic on the peripheral links, not simply the rated bandwidth of the peripheral links. The load balancing process disclosed herein thus is more effective than previous techniques. The preferred technique is particularly useful in a switch fabric comprising a plurality of interconnected switches and end nodes connected to two or more of the switches.

In one embodiment of the invention, a switch includes a CPU that executes a load balancing process, a memory coupled to the CPU and containing storage for a weight buffer, and a plurality of end node ports adapted to be connected to end node devices. Each end node port on the switch has an associated default cost that relates to the rated bandwidth of a peripheral link connecting the end node device to the end node port. The weight buffer contains weight values associated with the end node ports. The CPU preferably modifies the default costs of the end node ports using the weight values to produce effective costs that are used to balance network traffic loads through the ports. The weights preferably are programmed by a network administrator, or other person, commensurate with the observed or predicted traffic load on the peripheral links. For example, a peripheral link with a high volume of traffic may be assigned a higher weight than a peripheral link having a lower volume of traffic. The CPU preferably multiplies the default costs of the ports by their associated weights to produce the effective cost values used in the load balancing process.

The invention may also be embodied as a method including retrieving default cost values associated with a plurality of end node ports on a switch, modifying the default cost values to produce effective cost values associated with each of the ports, and balancing network traffic among said plurality of ports using the effective cost values. Further still, rather than weighting default cost values in a way commensurate with actual traffic volume on the peripheral links, an alternative embodiment of the invention includes programming the peripheral link costs commensurate with the traffic volume on the links.

Using any of the embodiments described herein, a network administrator can measure, predict or otherwise determine the volume of traffic on the various peripheral links. With this information, the administrator can adjust the weights or peripheral link costs in an attempt to improve the overall performance of the network. The disclosed embodiments thus provide a flexible mechanism for an administrator to fine tune the performance of a network. These and other aspects and benefits of the preferred embodiments of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which:

FIG. 5 depicts a load balancing scheme in accordance with the preferred embodiment of the invention which is based on actual traffic volume on the peripheral links, not the rated bandwidth of the links.

NOTATION AND NOMENCLATURE

Certain terms are used throughout the following description and claims to refer to particular system components. As one skilled in the art will appreciate, various companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect physical connection. Thus, if a first device couples to a second device, that connection may be through a direct physical connection, or through an indirect physical connection via other devices and connections. The term "peripheral link" refers to a communication link connecting an end node device (e.g., a server, storage device, etc.) to a switch in a network.

To the extent that any term is not specially defined in this specification, the intent is that the term is to be given its plain and ordinary meaning.

DETAILED DESCRIPTION OF THE PREFERRED EMBODIMENTS

Figure 1:
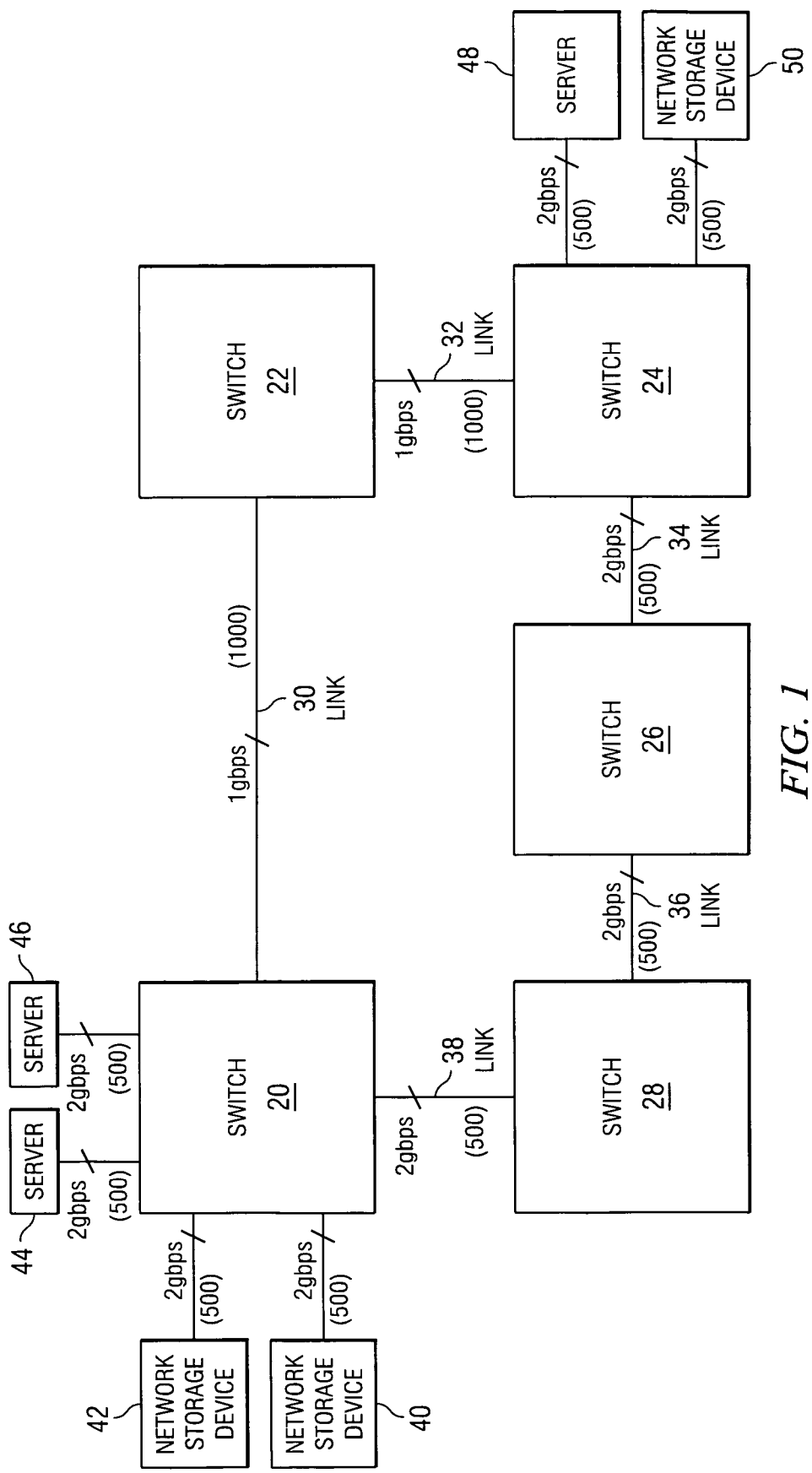
FIG. 1 shows a conventional switch fabric in which a shortest path selection algorithm is implemented.
Figure 2:
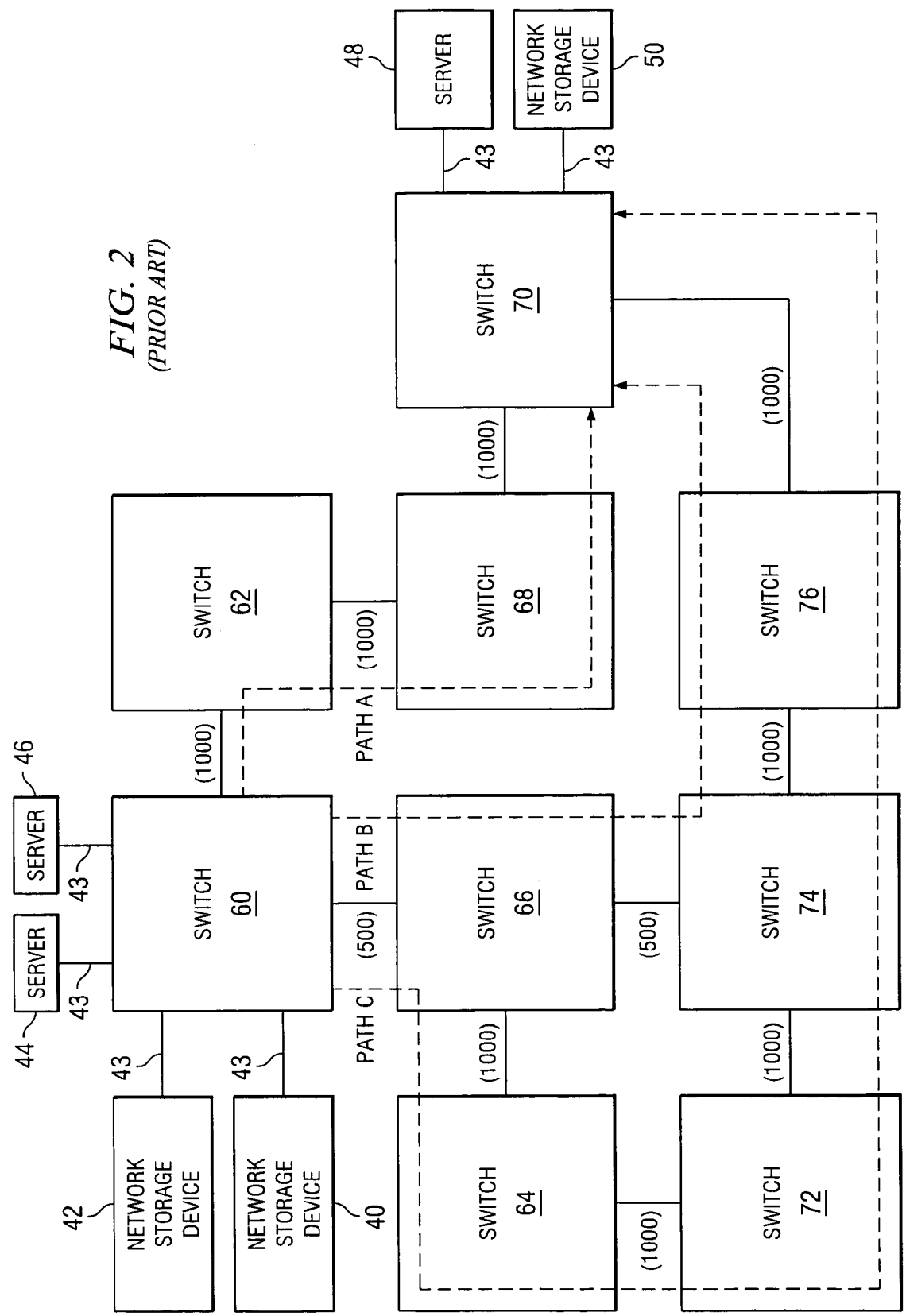
FIG. 2 shows another conventional switch fabric illustrating that more than one lowest cost path may exist between a pair of switches.

The preferred embodiment of the invention is based on an inefficiency in the way conventional load balancing schemes work. FIGS. 1 and 2 depict two types of links. The links that connect a pair of neighboring switches are referred to as inter-switch links ("ISLs"). As noted above, the links that connect an end node device (e.g., server or storage device) to a switch are referred to for purposes of this disclosure as "peripheral" links indicating their location on the periphery of the fabric. As with the ISLs, the peripheral links also have a rated bandwidth and an associated cost.

Figure 3:
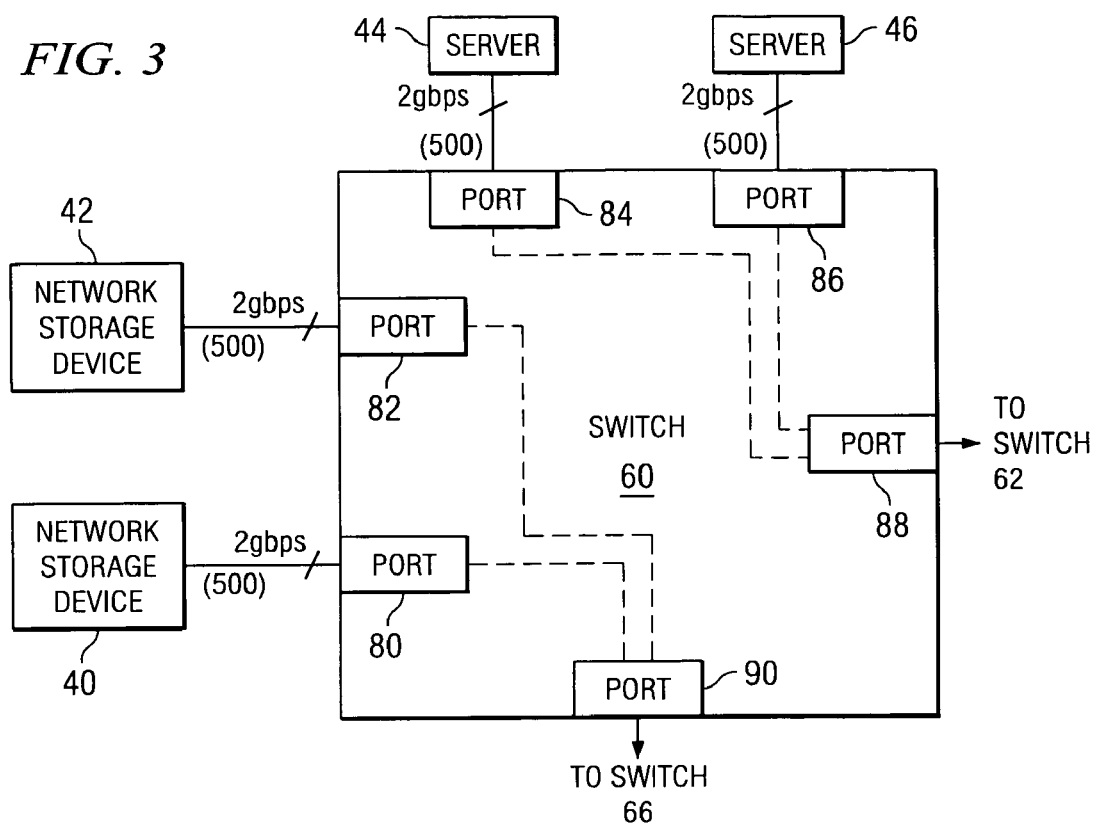
FIGS. 3 and 4 illustrate a conventional load balancing scheme which is based on the rated bandwidth of peripheral links.
Figure 4:
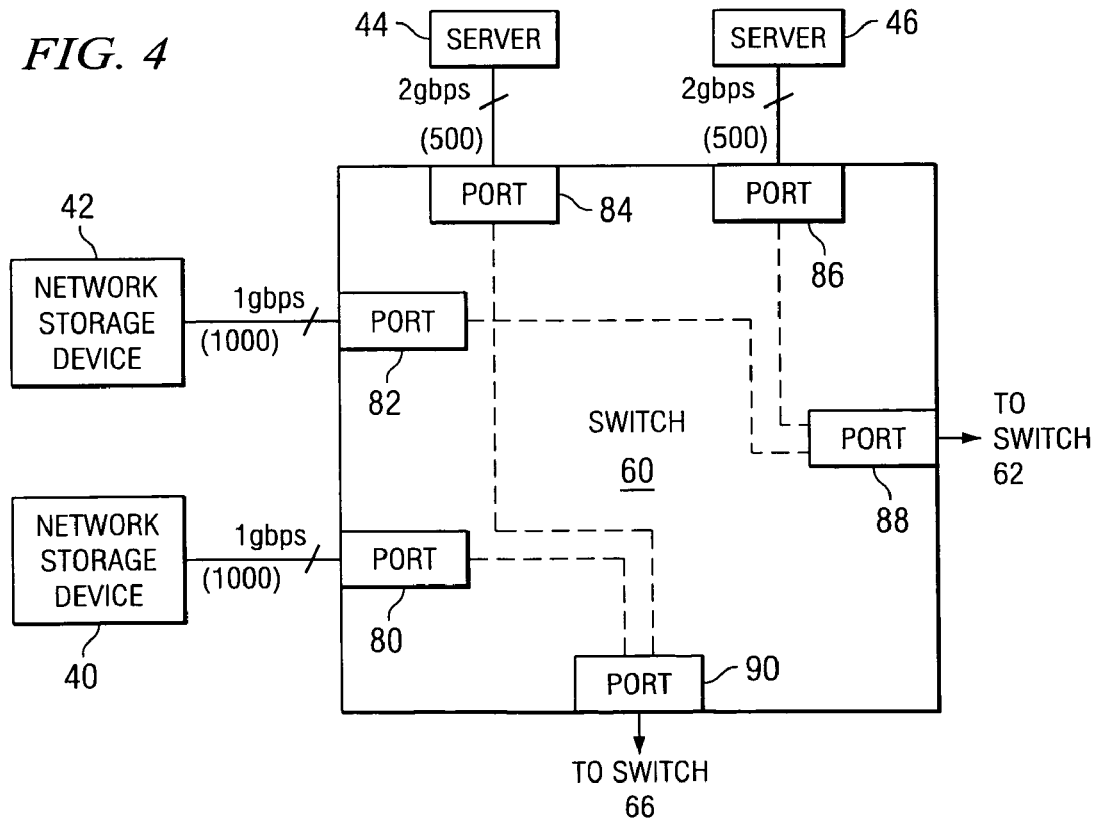

The following discussion related to FIGS. 3 and 4 illustrate the inefficiency of a conventional load balancing scheme which is based on the rated bandwidths of peripheral links. FIG. 3 shows switch 60 from FIG. 2 in greater detail. Each end node device 40-46 connects to a port on the switch. Because such ports connect to end node devices, such ports are referred to as "end node ports" in this disclosure. Storage device 40 connects to end node port 80, while devices 42-46 connect to end node ports 82-86, respectively. Ports 88 and 90 represent the ports which connect to neighboring switches 62 and 66 via ISLs. In the example of FIG. 3, devices 40-46 connect to switch 60 via 2 gbps peripheral links, which have an associated cost of 500. Conventional load balancing techniques use peripheral link cost values when balancing the traffic loads from the various end node devices connected to the fabric. As explained above, the cost of a link is related to its rated bandwidth. With regard to FIG. 3 and as noted previously, this means that the data from devices 40-46, which couple to switch 60 via peripheral links of equal cost, will be balanced evenly between both lowest cost paths A and B (FIG. 2). FIG. 3 illustrates one way in which the loads may be balanced by assigning traffic from devices 40 and 42 to be routed through port 90 while traffic from devices 44 and 46 is routed through port 88, as indicated by the dashed lines. In this way, both ports 88 and 90 are assigned to end node ports having a total cost of 1000.

FIG. 4 illustrates another possible scenario in which the links connecting servers 44 and 46 to ports 84 and 86 are 2 gpbs links having a cost of 500 each, but the links connecting storage devices 40 and 42 to ports 80 and 82 are only 1 gpbs links with a cost of 1000 each. In this situation, a conventional scheme to balance the traffic from devices 40-46 between paths A and B might assign end node ports 82 and 86 to port 88 and end node ports 80 and 84 to port 90. In this way, both ports 88 and 90 are assigned end node ports having a total cost of 1500 each.

As should be understood from the examples of FIGS. 3 and 4, conventional load balancing is based on the cost of the peripheral links and the cost of a link is based on the rated bandwidth of the link. Thus, conventional load balancing schemes take into account the rated bandwidth of the peripheral links, not the actual traffic volume on the peripheral links. Because actual traffic volume is not considered when assigning ports to each other within a switch for load balancing, a less than optimal configuration may result. For example, in FIG. 3, server 46 may experience a high demand for its processing capabilities and thus transmit and/or receive a full 2 gigabits of data every second through port 86 of switch 60. Yet, at the same time, the remaining devices 40-44, although connected via links rated for 2 gpbs of traffic, may not be needed as much as server 46. In fact, the situation may arise in which the aggregate of all of the data to/from devices 40-44 may be less than 2 gbps, or even less than 1 gpbs. If that were the case, it would have been more efficient to assign end node ports 80-84 to port 90 and dedicate port 88 for the exclusive use by server 46 via end node port 86.

Thus, in accordance with the preferred embodiment of the invention, load balancing within a switch is based on actual traffic volume on the peripheral links, not simply the rated bandwidth of the peripheral links. The preferred embodiment of the invention will now be explained with reference to the switch topology of FIG. 5 which repeats the topology of FIG. 1 and thus includes a switch fabric comprising switches 20-28 coupling together devices 40-50. The preferred embodiment of the invention, however, is not specific to any particular topology—more or fewer switches can be included and the switches can be connected in different ways than that shown in FIG. 5.

Referring still to FIG. 5, each switch 20-28 preferably includes a central processing unit ("CPU") 96 and memory 99 coupled to the CPU as illustrated with respect to switch 20. The memory 99 includes storage capacity for various types of data, programs or other information. Preferably, the memory 99 includes a load balancing process 98 and a weight buffer 94 used by the load balancing process. The load balancing process 98 comprises firmware instructions that are executed by CPU 96. The load balancing process 98 may implement any known algorithm for balancing loads based on peripheral link cost values. As will be explained below, however, the cost values used in this algorithm will be different than the cost values used previously. The weight buffer 94 is programmable and preferably contains weights corresponding to each of the switch's ports 80-90, or at least the end node ports that connect to devices via the peripheral links.

As explained above, conventional load balancing algorithms use the peripheral link costs to perform load balancing. In accordance with the preferred embodiment, the peripheral link costs, which are tied to the rated bandwidth of the peripheral inks, are referred to as "default costs." Rather than using peripheral link default costs, process 98 uses "effective costs" in the preferred load balancing scheme. The effective cost associated with a peripheral link/end node port preferably is a modified version of the default cost. The default cost has been modified by the CPU commensurate with the observed, predicted or otherwise determined volume or amount of peripheral link network traffic.

In one embodiment, the effective cost of a peripheral link preferably is computed as the product of the default cost and an associated weight contained in weight buffer 94. That is, Effective cost=weight*default cost The weight buffer 94 preferably includes a weight associated with each end node port. As shown, end node ports 80-86 have weights 80a-86a associated with them. In this embodiment, via a console 100 a network administrator, or other person, can program weight buffer 94 in each switch with any desired weights associated with each end node port. The weights preferably are set in accordance with the observed or predicted traffic volume over the various peripheral links. For example, a higher weight can be assigned to those ports for which higher traffic volume is observed or expected, while a lower weight can be assigned to ports for which lower traffic volume is observed or expected. Programming all of the weights in a switch to a value of 1 results in the effective costs being equal to the default costs which essentially is the implementation of the conventional load balancing scheme described above. Programming any one or more of the weights to a value greater or less than 1, preferably results in a different outcome for how the load balancing process 98 will cause the CPU 96 to route ports together within the switch.

By way of example, if the network administrator determines that the volume of traffic to/from server 46 is much higher than the traffic volume to/from end node devices 40, 42 and 44, the administrator may use console 100 to program the weight 86a associated with port 86 to a value greater than the weights associated with the other ports 80-84. For example, the weights for ports 80-84 may be programmed to a value of 1 while the weight 86a associated with port 86 may be programmed to a value greater than 1 (e.g., 2). This will result in the effective cost computed by the CPU 96 for port 86 to be twice that of the effective costs for ports 80-84 (assuming the default costs are all the same). In this example, the load balancing process 98 preferably will assign end node port 86 to 88 and ports 80-84 to port 90, or vice versa.

By modifying the default cost of a peripheral link/port by a weight to produce an effective cost to be used in the preferred load balancing scheme, load balancing thereby takes into account actual traffic volume, not just the rated bandwidth of the peripheral links as in conventional schemes. This results in a more efficiently managed network having better performance. The size of the weights will naturally depend on the actual amount of traffic observed on the various links. The administrator may adjust the weights and then observe the resulting network behavior. Depending on the observed behavior, the administrator then may readjust the weights in an effort to refine the network behavior to produce a desired performance level. The preferred embodiment of the invention provides a flexible mechanism for controlling network load balancing.

In one embodiment, the network administrator may use any commonly known or available network analysis tool for measuring or determining the traffic volume on each peripheral link. Alternatively, each switch in the fabric may keep track of the volume of traffic on each one of its end node ports and retain such statistical information in registers in the CPU 96 or in a buffer (not specifically shown) in memory 99. The administrator then may use console 100, or another mechanism, to retrieve such statistical information from the switches. With this information regarding the actual volume of data flowing on the peripheral links, the administrator can reprogram the weights in the various switches so as to exert control over the load balancing process. By programming the end node port weights to thereby modify the peripheral link default costs, the preferred embodiment of the invention also permits the network to continue to use an existing load balancing algorithm based on peripheral link cost (although the peripheral link costs used in the algorithm are effective costs, not defaults as in conventional systems). This permits the improved load balancing scheme to be backward compatible in a network also having switches that do not permit the peripheral link costs to be modified as described herein. Thus, switches that implement the preferred load balancing technique can be coupled to switches that do not include the preferred embodiment to form a network that permits a network administrator to control the load balancing process in those switches that implement the preferred embodiment.

In addition to having to having a person, such as a network administrator, adjust the end node port weights, each switch could be programmed to automatically adjust the weights without human involvement. As noted above, each switch in the network is capable of monitoring the volume of traffic through each of its end node ports. Consequently, an algorithm can be implemented in each switch as a firmware process that periodically retrieves the statistical information contained in the switch and computes a new set of weights. This can occur at any fixed or programmable interval of time (e.g., once per hour, once per day, etc.). The algorithm can be any desired technique for producing weight values based on peripheral link traffic volume.

In accordance with another embodiment of the invention, rather than programming weights associated with each end node port that are then multiplied by the default peripheral link costs, the network administrator can program the peripheral link costs themselves which may be stored in the end node ports or in memory 99. In a conventional system, the cost of each peripheral link is generally inversely related to its bandwidth. In this latter embodiment, the cost of a peripheral link is programmable by the administrator in a way that need not be directly related to the rated bandwidth of the link. Preferably, the administrator sets the cost of the peripheral links commensurate with the volume of traffic observed on the various links. Thus, higher links with a higher volume of traffic will be programmed to have a higher cost and links with a lower volume of traffic will be programmed to have a lower cost. As with the weights described above, the magnitude of the programmable peripheral link costs in this embodiment will depend on the amount of traffic actually observed on the various links. The administrator may adjust the costs and then observe the network performance. Depending on the observed performance, the administrator then may re-adjust the costs in an effort to refine the network behavior to produce a desired performance level.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of balancing network traffic in a network comprising a plurality of switches comprising end node ports coupled by peripheral links to end node devices, the method including:
    (a) retrieving default cost values associated with said end node ports;
    (b) modifying said default cost values using volumes of network traffic on said end node ports to produce effective cost values associated with each of said end node ports; and
    (c) balancing network traffic among said end node ports using said effective cost values.

2. The method of claim 1 wherein, (b) includes multiplying said default cost values associated with said ports by weight values also associated with said ports, said weight values determined from the volumes of network traffic.

3. The method of claim 1 further including programming a weight for each of said plurality of ports, each said weight determined from a volume of network traffic on each said port, said weights used in (b) to modify said default cost values.

4. A method of balancing network traffic in a network comprising a plurality of switches coupled via peripheral links to end node devices, the method including:
    (a) programming cost values for a plurality of ports on a switch, said polls connected via peripheral links to end node devices, and said cost values programmed based on the volume of network traffic on said peripheral links; and
    (b) balancing network traffic among said plurality of ports using said cost values.

5. The method of claim 4 wherein (a) includes setting higher cost values associated with ports that have a volume of network waffle that is higher than for other ports.

6. A method of balancing network traffic through a switch configured to be coupled to other switches via inter-switch links and to end node devices via peripheral links, the method including:
    (a) assigning end node ports to polls connected to the inter-switch links based on traffic volume on the peripheral links.

7. A network device, comprising:
    a CPU that executes a load balancing process;
    a memory coupled to said CPU, said memory containing storage for a weight buffer; and
    a plurality of end node ports adapted to be connected to end node devices, each end node port having an associated default cost that relates to the rated bandwidth of a peripheral link connecting an end node device to the end node port;
    wherein said weight buffer contains weight values associated with said end node ports, said weight values determined from an amount of network traffic through said end node ports; and
    wherein said CPU modifies said default costs using said weight values to produce effective costs that are used to balance network traffic loads associated with said end node ports.

8. The network device of claim 7 wherein said CPU modifies said default costs by multiplying said default costs by said weight values to produce said effective costs.

9. The network device of claim 7 wherein said weight values are programmable.

10. The network device of claim 7 wherein said network device is a switch.

11. A network device, comprising:
    a CPU that executes a load balancing process; and
    a plurality of end node ports adapted to be connected to end node devices via peripheral links, each end node port having an associated cost that is programmed commensurate with the volume of network traffic on the link connecting the end node device to the end node port;
    wherein said CPU uses said costs to balance network traffic loads associated with said end node ports.

12. The network device of claim 11 wherein said CPU sets higher cost values associated with end node ports that have a volume of network traffic than is higher than for other end node ports.

13. A computer readable storage medium for storing an executable set of software instructions that are executable by a CPU, said software instructions being operable to balance network traffic through a plurality of end node ports on a network switch, comprising:
    (a) a means for retrieving default cost values associated with the plurality of end node ports;
    (b) a means for modifying said default cost values using volumes of network traffic on peripheral links adapted to couple to said end node ports to produce effective cost values associated with each of said plurality of end node ports; and (c) a means for balancing network traffic among said plurality of end node ports using said effective cost values.

14. The storage medium of claim 13 wherein, (b) includes a means for multiplying said default cost values associated with said ports by weight values also associated with said port, said weight values determined from the volumes of network traffic.

15. The storage medium of claim 13 further including a means for programming a weight for each of said plurality of ports, each said weight determined from a volume of network traffic on each said port, said weights used in (b) to modify said default cost values.

16. A computer readable storage medium for storing an executable set of software instructions that are executable by a CPU, said software instructions being operable to balance network traffic load from through a plurality of end node ports on a network switch, including:

(a) a means for programming cost values for a plurality of ports on a switch, said ports connected via peripheral links to end node devices, and said cost values programmed as a function of the volume of network traffic on said peripheral links; and (b) a means for balancing network traffic among said plurality of ports using said cost values.

17. The method of claim 1, wherein said volumes of network traffic comprise one of observed volumes of network traffic and predicted volumes of network traffic.

18. The method of claim 4, wherein said volume of network traffic comprises one of observed volume of network traffic and predicted volume of network traffic.

19. The method of claim 6, said traffic volume comprising one of observed traffic volume and predicted traffic volume.

20. The network device of claim 7, wherein said amount of network traffic comprises one of observed amount of network traffic and predicted amount of network traffic.

21. The network device of claim 11, wherein said volume of network traffic comprises one of observed volume of network traffic and predicted volume of network traffic.

22. The storage medium of claim 13, wherein said volumes of network traffic comprise one of observed volumes of network traffic and predicted volumes of network traffic.

23. The computer readable storage medium of claim 16, wherein the volume of network traffic comprises one of observed volume of network traffic and predicted volume of network traffic.

* * * * *